(12) United States Patent
Singhal et al.

(10) Patent No.: US 11,803,574 B2
(45) Date of Patent: Oct. 31, 2023

(54) CLUSTERING APPROACH FOR AUTO GENERATION AND CLASSIFICATION OF REGIONAL SPORTS

(71) Applicant: Microsoft Technology Licensing, LLC, Redmond, WA (US)

(72) Inventors: Aman Singhal, Sammamish, WA (US); Shrestha Mohanty, Bellevue, WA (US); Marcelo Medeiros De Barros, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/339,696

(22) Filed: Jun. 4, 2021

(65) Prior Publication Data

US 2022/0365951 A1   Nov. 17, 2022

Related U.S. Application Data

(60) Provisional application No. 63/188,309, filed on May 13, 2021.

(51) Int. Cl.
| | | |
|---|---|---|
| *G06F 17/00* | (2019.01) | |
| *G06F 16/28* | (2019.01) | |
| *G06N 20/00* | (2019.01) | |

(52) U.S. Cl.
CPC ........... *G06F 16/285* (2019.01); *G06N 20/00* (2019.01)

(58) Field of Classification Search
CPC .............................. G06F 16/285; G06N 20/00
See application file for complete search history.

(56) References Cited

U.S. PATENT DOCUMENTS

| | | | | |
|---|---|---|---|---|
| 9,183,285 | B1* | 11/2015 | Brown | G06F 16/355 |
| 9,299,113 | B2* | 3/2016 | Alonso | G06Q 50/01 |
| 10,108,694 | B1* | 10/2018 | Moody | G06F 16/24573 |
| 11,443,006 | B2* | 9/2022 | Shetty | G06F 16/951 |
| 2009/0248494 | A1* | 10/2009 | Hueter | G06Q 30/0202 |
| | | | | 705/7.29 |
| 2015/0081713 | A1* | 3/2015 | Alonso | G06Q 10/109 |
| | | | | 707/738 |
| 2020/0125575 | A1* | 4/2020 | Ghoshal | G06F 40/247 |
| 2020/0175052 | A1* | 6/2020 | Wang | G06F 16/358 |
| 2022/0222289 | A1* | 7/2022 | Srinivasan | G06F 16/45 |

OTHER PUBLICATIONS

Andriy Shepitsen et al. Personalized recommendation in social tagging systems using hierarchical clustering. Proceedings of the 2008 ACM conference on Recommender systems, Association for Computing Machinery, USA, 259-26, <https://doi.org/10.1145/1454008.1454048>, October (Year: 2008).*

* cited by examiner

*Primary Examiner* — Greta L Robinson
(74) *Attorney, Agent, or Firm* — RAY QUINNEY & NEBEKER P.C.; Paul N. Taylor

(57) ABSTRACT

The present disclosure relates to systems, devices, and methods for annotating or classifying regional sports into new sports categories and generating webpages for the regional sports. The methods and systems may create new tabs or icons on the browser sports webpages with the regional sports allowing the user to select the regional sports and access a dedicated webpage for the regional sport with information for the regional sport.

18 Claims, 3 Drawing Sheets

CLUSTERING APPROACH FOR AUTO GENERATION AND CLASSIFICATION OF REGIONAL SPORTS

CROSS-REFERENCE TO RELATED APPLICATIONS

This application claims priority to and the benefit of U.S. Provisional Patent Application No. 63/188,309, filed on May 13, 2021, which is hereby incorporated by reference in its entirety.

BACKGROUND

There exists more than one thousand sports and leagues in the world and different sports are being played in various regions across the world. Most of the sports news websites serve only a few sports per region. Given many sports and leagues are not popular as compared to other sports, the sports news websites may not include the regional sports on the sports news websites, or the regional sports may be included under a broader sports category and difficult to locate or find.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for identifying a new sports category. The method may include receiving browser data. The method may include identifying sports articles included in the browser data. The method may include classifying the sports articles into a plurality of clusters, wherein each cluster of the plurality of clusters corresponds to a sports category. The method may include identifying a cluster of the plurality of clusters that does not have a tag that identifies a corresponding sports category of the sports articles included in the cluster. The method may include extracting at least one topic ore entity from the sports articles included the cluster. The method may include generating a new tag identifying the new sports category for the cluster based on the at least one topic or entity extracted.

Another example implementation relates to a system. The system may include one or more processors; memory in electronic communication with the one or more processors; and instructions stored in the memory, the instructions executable by the one or more processors to: receive browser data; identify sports articles included in the browser data; classify the sports articles into a plurality of clusters, wherein each cluster of the plurality of clusters corresponds to a sports category; identify a cluster of the plurality of clusters that does not have a tag that identifies a corresponding sports category of the sports articles included in the cluster; extract at least one topic or entity from the sports articles included in the cluster; and generate a new tag identifying a new sports category for the cluster based on the at least one topic or entity extracted.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
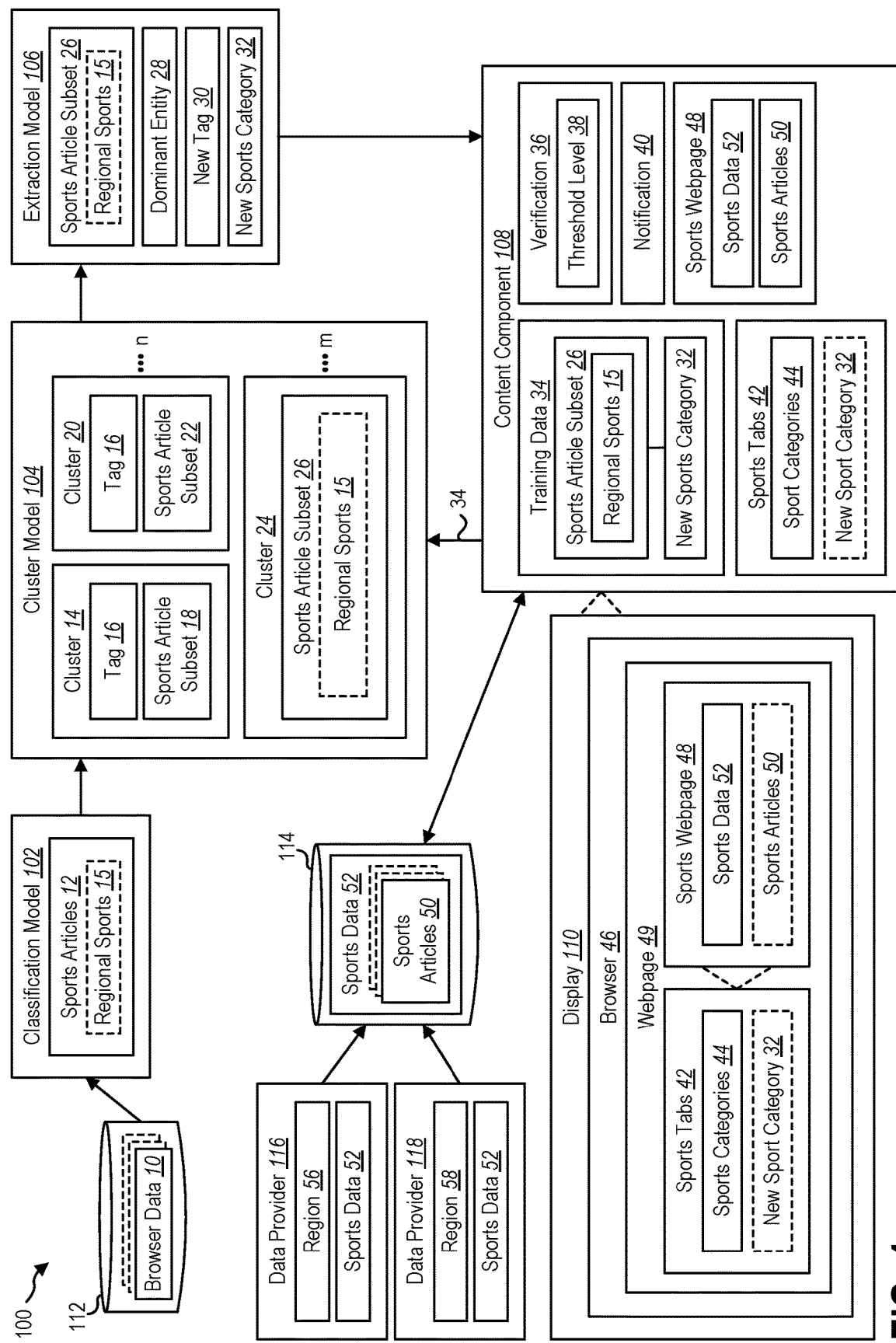
FIG. 1 illustrates an example environment for identifying and classifying regional sports in accordance with some implementations of the present disclosure.

This disclosure generally relates to a clustering approach that generates new sports categories for regional sports that are well known in areas of the world. In various regions throughout the world, regional sports are played that are not as well-known as mainstream sports worldwide or popular in multiple geographic regions (e.g., tennis, football, soccer, baseball, basketball, cricket, rugby, swimming, etc.). The regional sports may have a following of over a million fans because the regional sports are popular in the regions of the world where the regional sports are played but may be unknown outside of the regions. For example, in India, over two hundred sports are played in the different regions of the country.

Currently, when a web browser is accessed by a user and a user selects a tab or icon for sports from a webpage presented by the browser, different sports categories may be presented using various tabs or icons on the webpage. The sports categories loaded may be based on the geographic region where the user is interacting with the browser. For example, if a user is in Australia and loads a sports section of a webpage, a webpage is presented with different sports tabs for Australia. When a user selects a specific sport (e.g., cricket), a dedicated sports page may be loaded with information about the sport selected (e.g., upcoming games worldwide, recent scores of games, whether the Australian team is playing, news articles about teams or players, etc.). However, there may be regional sports that may be popular in Australia that are not included in the sports categories currently shown on the sports webpage for the browser.

Sports data displayed on the browser's webpages may be received from different data providers worldwide. The data providers provide information on sports from different country. Each market may have a plurality of data providers that provide data specific to sports in different languages. The data providers categorize the regional sports into a top level sports category (e.g., horse racing, running, soccer, etc.). Example regional sports in India include Jallikattu and Kambala, which are only played in the southern part of India. These regional sports are generally categorized as a top level sports category (e.g., horse racing or running).

The data providers do not have the capability of categorizing these regional sports into specific sports. Thousands of sports articles are generated daily, and manual curation of the sports articles may be difficult to determine sports categories for the regional sports. Manually classifying the sports articles and identifying the regional sports for each market may take months to complete. In addition, since the dataset is constantly changing with new browser data received from users worldwide, manual classification of the sports articles becomes prohibitively expensive.

The present disclosure provides methods and systems for annotating or classifying the regional sports into new sports categories and generating webpages for the regional sports. The methods and systems may create new tabs or icons on the browser sports webpages with the regional sports allowing the user to select the regional sports and access a dedicated webpage for the regional sport with information for the regional sport (e.g., news articles, upcoming games, recent games, or player information).

The present disclosure provides methods and systems for identifying articles about regional or specialized sports (e.g., arena football). The methods and systems may use a sports Bidirectional Encoder Representations from Transformers (BERT) to identify sports-related articles. The sports BERT may support multiple languages in determining the sports-related articles. The methods and systems may use Gaussian modelling to cluster the sports articles and identify tags for each cluster. The methods and systems may extract entities for clusters without existing tags, and new tags are identified based on the extracted entities. The new tags may correspond to new sports categories for the regional or specialized sports. If there are insufficient entities for the regional or specialized sports, the cluster may be flagged as a sport that does not have enough coverage in the system.

In some implementations, the method includes gathering EDGE™ browser data and passing the browser data through a sports BERT classification model to filter the sports articles from the browser data. The method includes tagging the sports articles with regional information. The method includes clustering the filtered sports articles with a gaussian mixture model (GMM) into different buckets or clusters, such as, NFL, MLB, etc. The clustering occurs with vectors and adds a tag to the clusters identifying the sports category for the cluster. The method identifies clusters without any existing tags. The method extracts topics (dominant) from the clusters that do not have pre-defined categories (new regional categories). The method generates tags from dominant entities (team names, league names, etc.) for the clusters without tags. The new tags may identify a new sports category for the regional sports included in the cluster. The method generates training data to tag articles with new sports categories for the regional sports. The method checks whether enough articles exist in the datastore for the regional sports (e.g., the data providers provided sufficient coverage of the regional sports). If enough articles exist in the datastore, the method integrates the new categories with ranking signals. The method identifies regions without enough articles on the regional sports (e.g., if enough articles do not exist in the datastore) and sends a notification to a business team, or other individuals, to create new deals with the data providers to power the experience.

One technical advantage of some implementations of the present disclosure is providing more webpages powered by a browser. By automatically training machine learning models to identify new sports categories, new dedicated sports webpages for the new sports categories may be created. As such, more users may use the browser. In addition, the present disclosure improves user efficiency by organizing and arranging the data into categories.

Another technical advantage of some implementations of the present disclosure is compute efficiency. Some implementations only need to process a small subset of sports articles, and thus, reducing the compute efficiency. By using a classification model (e.g., a BERT) to filter the sports articles from the browser data and classifying the sports articles into clusters, in some implementations, the sports articles are filtered multiple times into smaller groups or clusters for more efficient processing by the methods and systems.

The present disclosure generates new regional sports category in an automated fashion along with a tagging model to classify such sports articles. The present disclosure caters to sports users worldwide by providing new sports categories for regional sports specific to different regions worldwide where users may be interacting with a browser for sports information. By powering new webpages provided by a browser, active user engagement may increase, resulting in increased revenue. Moreover, the present disclosure may handle sports across all endpoints worldwide catering to needs for all users.

Referring now to FIG. 1, illustrated is an example environment 100 for identifying and classifying regional sports 15. Regional sports 15 may be sports that are played in specific regions of the world but may not be a sport played in other regions of the world (or may not be well known in other regions of the world). In addition, regional sports 15 may be specialized sports (e.g., arena football) or sports created from other sports with different rules. Popular sports that are well known and played in multiple geographic regions may include, but are not limited to, cricket, soccer, tennis, running, swimming, baseball, basketball, football, hockey, rugby, golf, and/or skiing. Regional sports 15 may be limited to a specific geographic region.

Users throughout the world may interact with a browser 46 via a display 110 to access information about the regional sports 15 and/or popular sports. The browser 46 allows the users to interact with information on the World Wide Web. When a user requests a webpage from a web site, the browser 46 retrieves the content of the webpage from a web server and displays the webpage on the device of the user. In addition, the browser 46 may present sports webpages with sports data 52 available for presentation by the browser 46. The sports data 52 may be available from various data providers 116, 118 worldwide through contracts or license agreements with the browser 46. The browser 46 may be a browser application on a device of the user. Examples of browsers 46 may include, but are not limited to, EDGE™ and INTERNET EXPLORER™. The browser 46 may present webpages 49 with sports tabs 42 or other icons with different sport categories 44. When the user selects a specific sport category 44 (e.g., tennis), the browser 46 may present a sports webpage 48 with dedicated sports information for the selected category 44 (e.g., information about upcoming tennis matches, video highlights of recent tennis matches, audio recordings of interviews with players, tennis news articles, etc.). The users may also use the browser 46 to access different websites related to the specific sport category 44. As such, browser data 10 may be generated from users worldwide based on the interactions of the users with the browser 46. The browser data 10 may be stored in one or more datastores 112.

The environment 100 may access a plurality of browser data 10 from the datastores 112. The browser data 10 is used by environment 100 in a consolidated format without user identification information. In an implementation, the browser data 10 includes EDGE™ browser data. The browser data 10 is available from a plurality of datastores 112 from different countries worldwide. The browser data 10 provides information on uniform resource locator (URLs) visited by millions of users worldwide and may be for a variety of topics.

The environment 100 may include a classification model 102. The classification model 102 may receive, or otherwise access, the browser data 10 and may identify different sports articles 12 in the browser data 10. The sports articles 12 may be for popular sports known in multiple regions of the world (e.g., cricket, soccer, tennis, running, swimming, baseball, basketball, football, hockey, rugby, and/or skiing). In addition, the sports articles 12 may be for regional sports 15. As such, the classification model 102 may filter the sports articles 12 from the browser data 10.

The classification model 102 may be trained to identify and classify sports articles 12 in the browser data 10. Different websites may be popular in different countries for sports. Moreover, different languages may be used to discuss sports throughout the world. As such, the classification model 102 may be trained using multiple languages and data from websites worldwide.

In some implementations, the classification model 102 is a Bidirectional Encoder Representations from Transformers (BERT) model trained specifically for sports. The sports BERT model is a deep learning model pre-trained for recognizing different sports articles. As such, the sports BERT model may identify and filter various sports articles 12 from the browser data 10.

The environment 100 may include a cluster model 104. The cluster model 104 may receive the sports articles 12 identified by the classification model 102 and may classify the sports articles 12 into a plurality of clusters (e.g., cluster 14, cluster 20, cluster 24) or buckets. In some implementations, the cluster model 104 is a gaussian mixture model (GMM) that identifies different groups or clusters for the sports articles 12. Any number of clusters may be generated by the cluster model 104.

Different clusters or buckets may have a different number of sports articles. For example, one cluster (e.g., cluster 14) has five hundred sports articles, another cluster (e.g., cluster 20) has two hundred sports articles, and a third cluster (e.g., cluster 24) has a thousand sports articles. As such, each cluster may include a portion of the sports articles 12 (e.g., sports article subsets 18, 22, 26).

The clusters may be based on different predefined sports categories 44. The predefined sports categories 44 may be for the popular sports that are well-known worldwide or in multiple regions throughout the world. One example includes fifteen clusters generated by the cluster model 104 for fifteen different sport categories 44. Thus, the sports articles included in the clusters 14, 20, 24 (e.g., the sports articles subsets 18, 22, 26) may be related to the sport category 44 for the cluster 14, 20, 24. The clustering may occur with vectors and may add a tag 16 to the clusters identifying the sports category 44 for the cluster.

Different clusters (e.g., cluster 14, cluster 20) may have tags 16 identifying or labeling the sport category 44 for the cluster. For example, cluster 14 includes a tag 16 (e.g., cricket) and the sports articles included in the cluster (e.g., the sports article subset 18) include a portion of the sports articles 12 related to the sport category 44 identified by the tag 16 (e.g., cricket sports articles). Cluster 20 may include a tag 16 (e.g., soccer) and the sports articles in the cluster (e.g., the sports article subset 22) includes the sports articles 12 related to the sport category 44 labeled by the tag 16 (e.g., soccer sports articles). While two clusters are illustrated with tags 16, any number of clusters may be generated with tags 16 (up to n, where n is a positive integer).

In addition, different clusters (e.g., the cluster 24) may not have a tag 16 identifying the sport category 44 for the cluster. While one cluster (e.g., the cluster 24) is illustrated without a tag 16, any number of clusters may be identified without tags 16 (up to m, where m is a positive integer). The clusters that do not have tags 16 may include sports articles in the clusters (e.g., the sports article subset 26) that are not associated with a predefined sports category 44. For example, the sports articles included in the sports article subset 26 are associated with regional sports 15 that are different from the predefined sports categories 44.

The regional sports 15 may be popular (e.g., over a million fans) in the region where the browser data 10 originated from (e.g., where the interactions occurred with the browser 46 for the browser data 10), and thus, users in a particular region may generate large volumes of browser data 10 related to the regional sports (visiting webpages for the regional sports, writing publications about the regional sports, watching videos for the regional sports). As such, the volume of sports articles 12 related to the regional sports 15 may be large and the cluster model 104 may classify the sports articles 12 into a cluster for the regional sports 15. However, since the regional sports 15 may not be well known worldwide or in multiple regions throughout the world, the regional sports 15 may not already have a predefined sports category 44.

One example use case is in the Australian market over 100 million articles are identified in the browser data 10. A sports BERT classification model (e.g., classification model 104) classifies 10 million sports articles out of the 100 million articles in the browser data 10. The clustering model 104 places the 10 million sports articles into different clusters (e.g., clusters 14, 20) with tags 16 labeling the sports discussed in the sports articles included in the clusters (e.g., sports article subsets 18, 22). One tag 16 for a cluster (e.g., cluster 14) may be Australian football league. Another tag 16 for a different cluster (e.g., cluster 20) may be cricket. Some of the clusters (e.g., cluster 24) may not have a tag that identifies a sports category of the sports articles in the clusters (e.g., sports article subset 26). For example, out of fifteen clusters, three clusters are without a tag. The clusters without a tag may be for different regional sports 15 or specialized sports for Australia.

The environment 100 may also include one or more extraction models 106 that receives from the cluster model 104, the sports articles subset 26 from the cluster 24 without a tag 16. Different topic extraction models 106 may extract the topics or entities from the sports articles included in the cluster without a tag 16 (e.g., the sports articles subset 26). The extraction models 106 may identify a name, or other identifier, for a regional sport 15 mentioned in the sports articles included in the cluster. The name may be based on the topics or entities extracted (team names, league names, etc.). The extraction model 106 may identify a dominant entity 28 (a most important entity) mentioned in the sports articles in the cluster (e.g., the sports articles subset 26). The extraction model 106 may use the topics or the dominant entity 28 to identify a new sports category 32 and generate a new tag 30 based on the name identified for the regional sport 15. The new tag 30 may be for a new sport category 32 specific to a region of the world. The extraction models 106 may be natural language processing (NLP) models that identify the dominant entities 28 in the sports articles 12.

The environment 100 may include a content component 108 that receives, from the extraction component, the sports article subset 26 and the new sports category 32 for the regional sport 15 mentioned in the sports article subset 26. The content component 108 may perform a verification to ensure that the regional sport 15 is a valid sport. The content component 108 may compare the new sport category 32 to other resources to ensure that the new sport category 32 is an actual sport. For example, the method may compare the new sports category 32 with an online encyclopedia webpage for the regional sport 15 to ensure that the regional sport 15 exists.

The content component 108 may generate training data 34 with the sports articles 12 included in the sports article subset 26 and the associated new sports category 32 for the regional sport 15. The content component 108 may send the training data 34 to the cluster model 104 to train the cluster model 104 to identify the regional sport 15 and the associated sports category 32. As such, the content component 108 may use the sports articles 12 identified from the cluster 24 as training data 34 input to train the cluster model 104 to automatically identify the new sports category 32 and use the new tag 30 to label the cluster for the regional sport 15.

The content component 108 may perform a verification 36 to ensure that the sports data 52 accessible to the browser 46 for the regional sport 15 is above a threshold level 38. The threshold level 38 may ensure that enough sports data 52 is available for access by the browser 46 to create a dedicated sports webpage 48 for the new sports category 32.

If the sports data 52 available exceeds the threshold level 38, the content component 108 may add the new sports category 32 to the sports tabs 42 to be presented on a webpage 49 (e.g., a general sports webpage or a home webpage) on the browser 46. In addition, the content component 108 may generate a sports webpage 48 dedicated to the new sport category 32 that presents the sports data 52 for the regional sport 15 (e.g., sports articles 50, upcoming game information, score information, player information, team information, etc.). For example, if a user selected a sport included in the sports tabs 42, the browser 46 loads the dedicated sports webpage associated with the selected sport with the sports data 52 available for the selected sport.

The sports data 52 may be accessed from a datastore 114 in communication with a plurality of data providers 116, 118 from different regions 56, 58 of the world. The data providers 116, 118 may provide the sports data 52 to the browser 46, or access to the sports data 52 by the browser 46. The sports data 52 may be specific to the region 56, 58 of the data provider 116, 118. For example, the data provider 116 is from India and provides sports data 52 specific to India. Another example includes the data provider 118 is from Africa and provides sports data 52 specific to Africa.

While two data providers 116, 118 are illustrated in two different regions 56, 58. There may be more than one data provider in each region (e.g., twenty different data providers from Africa and ten different data providers from India). Moreover, there may be any number of data providers in any number of regions worldwide. The sports data 52 accessible by the browser 46 may be based on different contracts or licenses that the browser 46 has with the different data providers 116, 118. As such, the browser 46 may only have access to a portion of the available spots data 52 for a region 56, 58.

Once a new sports category 32 is identified, a comparison may be made periodically (e.g., daily, weekly) with the sports data 52 stored in the datastore 114 to determine whether enough sports articles 50 are received within a time frame (e.g., daily, weekly) for the new sports category 32 and the sports data 52 exceeds the threshold level 38. For example, the threshold level 38 is twenty articles per day.

If the sports data 52 is below the threshold level 38, the content component 108 may generate a notification 40 indicating that additional sports data 52 may be necessary for the regional sport 15 to prepare a dedicated sports webpage 48 for the regional sport 15 and include the new sports category 32 on the webpage 49 (e.g., a general sports webpage or a home webpage) of the browser 46. For example, the notification 40 is sent to a business team notifying the business team that additional sports data 52 is needed from the regional data providers 116, 118 within a specific region 56, 58 for the regional sport 15. New contracts with the regional data providers 116, 118 may be created for the additional sports data 52 for the new sports category 32 and/or additional regional data providers may be contacted to ensure that more sports data 52 becomes available for the new sports category 32 identified so that a dedicated sports webpage 48 may be created for the new sports category 32 on the browser 46.

The content component 108 may integrate the new sports category 32 for display on a webpage 49 (e.g., a general sports webpage or a home webpage) of the browser 46. The content component 108 may assign the new sports category 32 to a geographic region (e.g., region 56, region 58) and may cause the new sports category 32 to be presented with other sports categories 44 on the webpage 49 to users determined to be in the region. The content component 108 may display the new sports category 32 in the sports tabs 42 (or icons) with the sport categories 44 for other well-known sports (e.g., football, baseball, basketball, tennis, soccer, rugby, cricket, etc.). The content component 108 may user a ranker to determine an order for presenting the new sport category 32 relative to the other sport categories 44.

The environment 100 may have multiple machine learning models running simultaneously. For example, one or more of the classification model 102, the cluster model 104, and/or the extraction model 106 run concurrently. In some implementations, one or more computing devices (e.g., servers and/or devices) are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the classification model 102, the cluster model 104, the extraction model 106, the content component 108, the display 110, and/or the datastores 112, 114 are implemented wholly on the same computing device. Another example includes one or more subcomponents of the classification model 102, the cluster model 104, the extraction model 106, the content component 108, the display 110, and/or the datastores 112, 114 implemented across multiple computing devices. Moreover, in some implementations, the classification model 102, the cluster model 104, the extraction model 106, the content component 108, the display 110, and/or the datastores 112, 114 are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular embodiment. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

As such, environment 100 may automatically identify regional sports 15 or specialized sports specific to different areas of the world and determine a new sports category 32 for the identified regional sports 15. Environment 100 may add the new sports category 32 to a webpage 49 presented by a browser 46 and present dedicated sports webpages 48 for the regional sports 15 through the browser 46.

Figure 2:
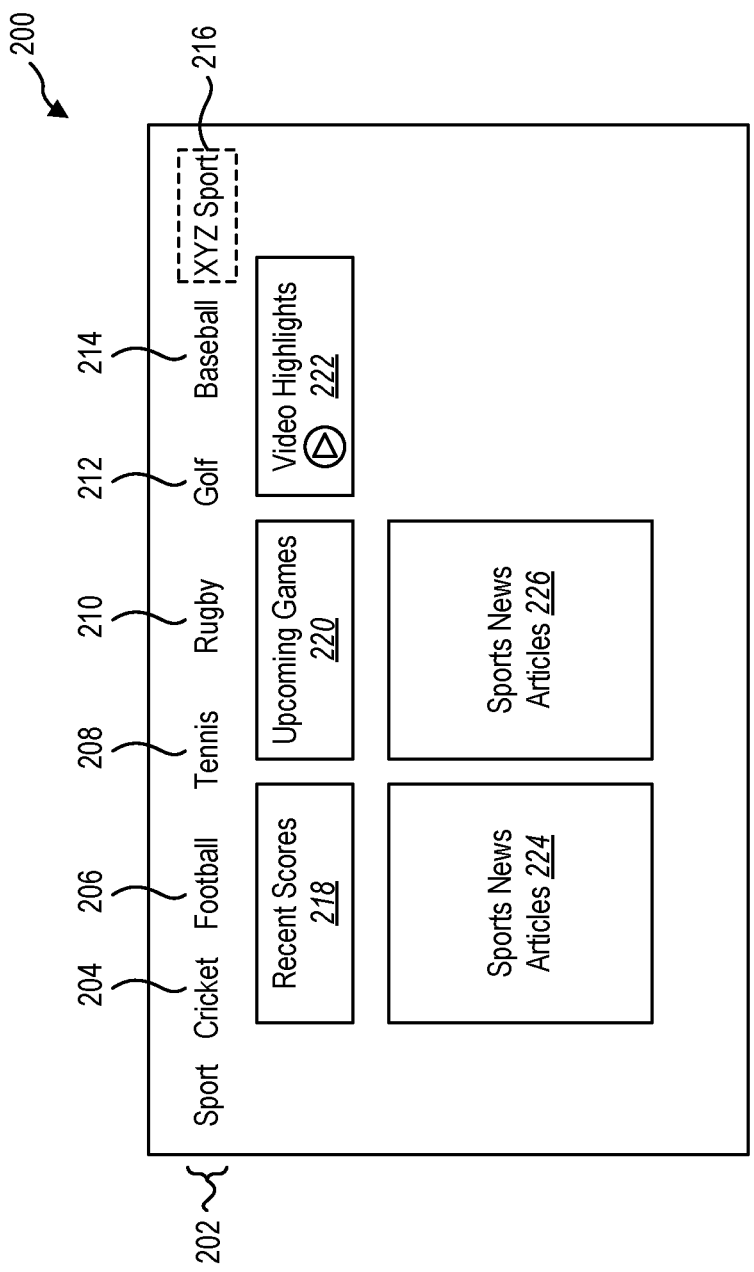
FIG. 2 illustrates an example webpage presented on a browser in accordance with some implementations of the present disclosure.

Referring now to FIG. 2, illustrated is an example webpage 200 for presentation on a display 110 (FIG. 1) using a browser 46 (FIG. 1). The webpage 200 may be a sports webpage or a home webpage (e.g., webpage 49) presented by the browser 46. In addition, the webpage 200 may be a dedicated sports webpage 48 (FIG. 1) presented by the browser 46.

The webpage 200 may include a sports tab 202 with a plurality of sports categories (e.g., sports categories 44). The sports tab 202 includes the mainstream sports categories cricket 204, football 206, tennis 208, rugby 210, golf 212, and baseball 214. In addition, the sports tab 202 includes a regional sport category XYZ sport 216 for a regional sport XYZ. The regional sports category XYZ sport 216 may be a new sports category 32 (FIG. 1) automatically identified for the regional sport XYZ by environment 100 (FIG. 1). The regional sport XYZ may be popular in a region of the world where the webpage 200 is being requested by a user. For example, the user is in Australia and the regional sport XYZ is played in Australia. The content component 108 (FIG. 1) may place the sports categories (e.g., cricket 204, football 206, tennis 208, rugby 210, golf 212, baseball 214, and XYZ sport 216) in an order based on a ranking of the popularity of the different sports in the region where the webpage 200 is being requested. As such, the order of the sports categories displayed in the sports tab 202 on the webpage 200 may change based on different regions of the world.

The webpage 200 may also include sports data 52, such as, but not limited to, recent scores 218, upcoming games 220, video highlights 222, and/or sports news articles 224, 226. If the webpage 200 is a dedicated sports webpage 48 presented by the browser 46 for the regional sport XYZ, the recent scores 218, upcoming games 220, video highlights 222, and/or sports news articles 224, 226 may be related to the regional sport XYZ. If the webpage 200 is a general sports webpage or a home webpage presented by the browser, the recent scores 218, upcoming games 220, video highlights 222, and/or sports news articles 224, 226 may cover a plurality of sports.

Figure 3:
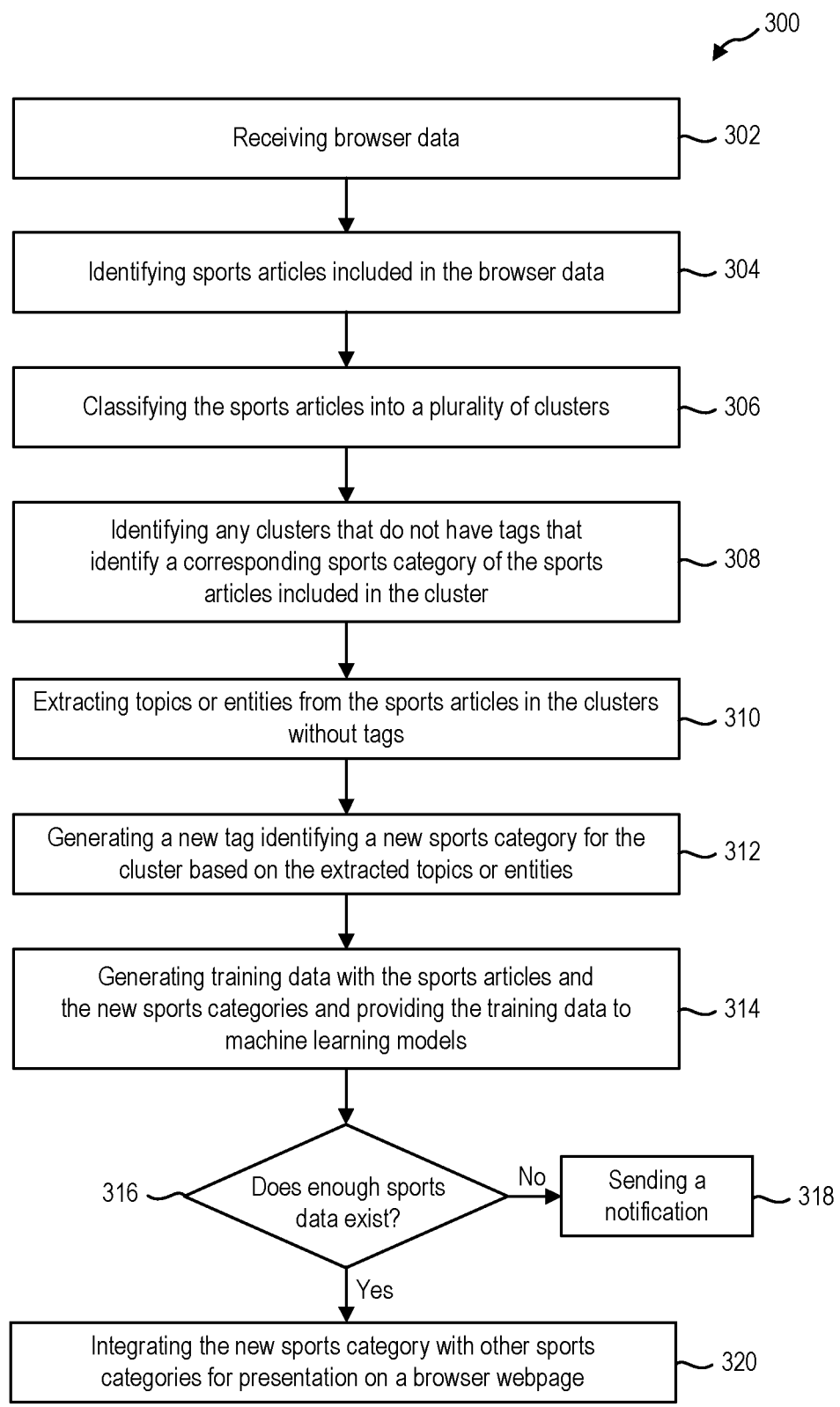
FIG. 3 illustrates an example method for identifying and classifying regional sports in accordance with some implementations of the present disclosure.

Referring now to FIG. 3, illustrated is an example method 300 for identifying and classifying regional sports 15. The actions of method 300 may be performed periodically as new browser data 10 is received from one or more data sources worldwide to automatically identify any new regional sports 15 that may be included in the browser data 10. The actions of method 300 are discussed below with reference to the architecture of FIG. 1.

At 302, method 300 includes receiving browser data. The browser data 10 may be generated from users worldwide based on the interactions of the users with the browser 46. The browser data 10 is available from a plurality of datastores 112 from different countries worldwide. The browser data 10 provides information on uniform resource locator (URLs) visited by millions of users worldwide and may be for a variety of topics. In an implementation, the browser data 10 includes EDGE™ browser data. The classification model 102 may receive, or otherwise access, the browser data 10.

At 304, method 300 includes identifying sports articles included in the browser data. The classification model 102 may filter the sports articles 12 from the browser data 10 and may be trained to identify and classify sports articles 12 in the browser data 10. Different websites may be popular in different countries for sports. Moreover, different languages may be used to discuss sports throughout the world. As such, the classification model 102 may be trained using multiple languages and data from websites worldwide. In some implementations, the classification model 102 is a Bidirectional Encoder Representations from Transformers (BERT) model trained specifically for sports.

At 306, method 300 includes classifying the sports articles into a plurality of clusters. The cluster model 104 may receive the sports articles 12 identified by the classification model 102 and may group the sports articles 12 into a plurality of clusters (e.g., cluster 14, cluster 20, cluster 24) or buckets. In some implementations, the cluster model 104 is a gaussian mixture model (GMM) that identifies different groups or clusters for the sports articles 12. Any number of clusters may be generated by the cluster model 104. Different clusters or buckets may have a different number of sports articles. Each cluster of the plurality of clusters may correspond to a sports category. The clusters may be based on different predefined sports categories 44. The predefined sports categories 44 may be for popular sports that are well-known worldwide or in multiple regions throughout the world. One example includes fifteen clusters generated by the cluster model 104 for fifteen different sport categories 44. Different clusters (e.g., cluster 14, cluster 20) may have tags 16 identifying or labeling the sport category 44 for the cluster.

At 308, method 300 includes identifying any clusters that do not have tags that identify a corresponding sports category of the sports articles included in the cluster. The extraction model 106 may identify clusters (e.g., cluster 24) that do not have tags 16 identifying a corresponding sport category (e.g., sport category 44) for the cluster. The clusters that do not have tags 16 may include sports articles in the cluster (e.g., the sports article subset 26) that are not associated with a predefined sports category 44. The sports articles included in the cluster (e.g., the sports article subset 26) may be associated with regional sports 15 or specialized sports that are different from the predefined sports categories 44. For example, out of fifteen clusters, three clusters do not have a tag 16.

At 310, method 300 includes extracting topics or entities from the sports articles in the clusters without tags. One or more extraction models 106 may extract the topics or entities from the sports articles (e.g., the sports article subset 26) included in the cluster (e.g., the cluster 24). The extraction models 106 may identify a name, or other identifier, for a regional sport 15 mentioned in the sports articles included in the cluster. The name may be based on the entities extracted (team names, league names, etc.). The extraction model 106 may identify a dominant entity 28 (a most important entity) mentioned in the sports articles included in the cluster.

At 312, method 300 includes generating a new tag identifying a new sports category for the cluster. The extraction model 106 may use the topics and/or the dominant entity 28 to identify a new sports category 32 and a new tag 30 for the cluster based on the name identified for the regional sport 15. The new tag 30 may be for a new sport category 32 specific to a region of the world. The extraction models 106 may be natural language processing (NLP) models that identify the dominant entities 28 in the sports articles 12.

At 314, method 300 includes generating training data with the sports articles and the new sports categories and providing the training data to one or more machine learning models. The content component 108 may generate training data 34 with the sports articles included in the cluster (e.g., the sports article subset 26) and the associated new sports category 32 for the regional sport 15. The content component 108 may send the training data 34 to the cluster model 104 to train the cluster model 104 to identify the regional sport 15 and the associated sports category 32. As such, the content component 108 may use the sports articles identified from the cluster 24 as training data 34 input to train the cluster model 104 so that the cluster model 104 may automatically identify the new sports category 32 and use the new tag 30 to label the cluster for the regional sport 15.

At 316, method 300 includes determining whether enough sports data exists for the new sports category. The content component 108 may perform a verification 36 to ensure that the sports data 52 accessible to the browser 46 for the regional sport 15 is above a threshold level 38. The threshold level 38 may ensure that enough sports data 52 is available for access by the browser 46 to create a dedicated sports webpage 48 for the new sports category 32.

At 318, method 300 includes sending a notification indicating that additional sports data is necessary in response to determining that more sports data is needed for the new sports category. For example, cluster 24 has one hundred thousand sports articles included in the sports article subset 26 for a new sports category 32 for a regional sport 15. However, the browser datastore (e.g., datastore 114) only has twenty sports articles 50 for the regional sport 15. The content component 108 may determine that additional sports data 52 is needed for the new sports category 32 (e.g., the twenty sports articles 50 is below a threshold level of forty articles) and sends a notification 40 to a business team indicating that additional sports data 52 is needed for the new sports category 32. New contracts with the regional data providers 116, 118 may be created for the additional sports data 52 for the new sports category 32 and/or additional regional data providers may be contacted to ensure that more sports data 52 becomes available for the new sports category 32 identified so that a dedicated sports webpage 48 may be created for the new sports category 32 on the browser 46.

At 320, method 300 includes integrating the new sports category with other sports categories for presentation on a browser webpage in response to determining that enough sports data exists for the new sports category. If the sports data 52 available exceeds the threshold level 38, the content component 108 may integrate the new sports category 32 for display on a webpage 49 (e.g., a general sports webpage or a home webpage) of the browser 46. The content component 108 may assign the new sports category 32 to a geographic region (e.g., region 56, region 58) and may cause the new sports category 32 to be presented with other sports categories 44 to users determined to be in the region. The content component 108 may display the new sports category 32 in the sports tabs 42 (or icons) with the sport categories 44 for other well-known sports (e.g., football, baseball, basketball, tennis, soccer, rugby, cricket, etc.). The content component 108 may user a ranker to determine an order for presenting the new sport category 32 relative to the other sport categories 44. In addition, the content component 108 may generate a sports webpage 48 dedicated to the new sport category 32 that presents the sports data 52 for the regional sport 15 (e.g., sports articles 50, upcoming game information, score information, player information, team information, etc.).

As such, method 300 may be used to identify regional sports and generate new regional sports category in an automated fashion.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure is related to methods and systems for identifying articles about regional or specialized sports (e.g., arena football). The methods and systems generate new sports categories in an automated fashion for the regional or specialized sports. The methods and systems cater to sports users worldwide by providing new sports categories for regional or specialized sports specific to different regions worldwide.

The methods and systems annotate or classify the regional sports into new sports categories and generate webpages for the regional sports. The methods and systems create new tabs or icons on the browser sports webpages with the regional sports allowing the user to select the regional sports and access a dedicated webpage for the regional sport with information for the regional sport (e.g., news articles, upcoming games, recent games, or player information).

In some implementations, browser data is gathered from a plurality of users worldwide and the browser data is passed through a classification model to filter the sports articles from the browser data. The methods and systems tag the sports articles with regional information and filter the articles into sports articles. The methods and systems cluster the filtered sports articles into different buckets or clusters, such as, NFL, MLB, etc. The clustering occurs with vectors and a tag is added to the clusters identifying the sports category for the cluster. The methods and systems identify clusters without any existing tags. The methods and systems extract topics (e.g., dominant entities) from the clusters without tags identifying pre-defined categories (e.g., clusters with regional sports or specialized sports). The methods and systems generate tags from the dominant entities extracted (team names, league names, etc.) for the clusters without tags. The new tags may correspond to a new sports category for the regional or specialized sports within the cluster.

The methods and systems generate training data to tag articles with the newly created categories for the regional sports or specialized sports. The methods and systems check whether enough articles exist in the datastore for the new sports category. If enough articles exist in the datastore, the methods and systems integrate the new sports categories with ranking signals. The methods and systems identify regions without enough articles on the regional sports (e.g., if enough articles do not exist in the datastore from the different data providers) and send a notification to a business team, or other individuals, to create new deals with different data providers to power the experience.

In some implementations, a sports Bidirectional Encoder Representations from Transformers (BERT) is used to identify sports-related articles. The sports BERT may support multiple languages in determining the sports-related articles. In some implementations, a gaussian mixture model (GMM) is used to cluster the sports articles and identify tags for each cluster. The tags may identify a sports category of the clusters of articles.

One technical advantage of some implementations of the present disclosure is providing more webpages powered by a browser. By automatically training machine learning models to identify new sports categories, new dedicated sports webpages for the new sports categories may be created. As such, more users may use the browser.

As such, the methods and systems annotate or classify regional sports into new sports categories and generate webpages for the regional sports. In some implementations, new tabs or icons are created on the browser sports webpages with the regional sports allowing the user to select the regional sports and access a dedicated webpage for the regional sport with information for the regional sport. By powering new webpages provided by a browser, active user engagement may increase, resulting in increased revenue. Moreover, the methods and systems handle sports across all endpoints worldwide catering to needs for all users.

(A1) Some implementations include a method for identifying a new sports category. The method includes receiving (302) browser data (e.g., browser data 10). The method includes identifying (304) sports articles (e.g., sports articles 12) included in the browser data. The method includes classifying (306) the sports articles into a plurality of clusters (e.g., clusters 14, 20, 24), wherein each cluster of the plurality of clusters corresponds to a sports category (e.g., sports categories 44). The method includes identifying (308) a cluster (e.g., cluster 24) of the plurality of clusters that does not have a tag (e.g., tag 16) that identifies a corresponding sports category (e.g., sport category 44) of the sports articles included in the cluster. The method includes extracting (310) at least one topic or entity from the sports articles included the cluster. The method includes generating (312) a new tag (e.g., new tag 30) identifying the new sports category (e.g., new sports category 32) for the cluster based on the at least one topic or entity extracted.

(A2) In some implementations of the method of A1, the new sports category is for a regional sport (e.g., regional sport 15).

(A3) In some implementations, the method of A1 or A2 includes assigning the new sports category to a region (e.g., region 56, region 58) and causing the new sports category to be presented with other sports categories to users determined to be in the region.

(A4) In some implementations of the method of any of A1-A3, the at least one topic or entity extracted is a dominant entity (e.g., dominant entity 28) discussed in the sports articles included in the cluster.

(A5) In some implementations, the method of any of A1-A4 includes generating (314) training data (e.g., training data 34) with the sports articles included in the cluster and the new sports category; and providing (314) the training data to one or more machine learning models (e.g., cluster model 104) to train the one or more machine learning models to automatically identify the new sports category.

(A6) In some implementations, the method of any of A1-A5 includes determining (316) whether an amount of sports data (e.g., sports data 52) available for the new sports category exceeds a threshold level (e.g., threshold level 38) by comparing the sports data available to the threshold level.

(A7) In some implementations of the method of any of A1-A6, the sports data includes sports articles and other information for a regional sport.

(A8) In some implementations of the method of any of A1-A7, the sports data is accessed from a plurality of data providers from different regions worldwide.

(A9) In some implementations, the method of any of A1-A8 includes sending (318) a notification (e.g., notification 40) indicating that additional sports data is necessary for the new sports category in response to the sports data being below the threshold level.

(A10) In some implementations, the method of any of A1-A9 includes integrating (320) the new sports category with other sports categories for presentation on a browser webpage (e.g., webpage 49) in response to the sports data exceeding the threshold level; and creating a sports webpage (e.g., sports webpage 48) dedicated to a regional sport with the sports data for presentation by a browser.

(A11) In some implementations of the method of any of A1-A10, one or more machine learning models are used for identifying the sports articles, classifying the sports articles into the plurality of clusters, identifying the at least one cluster in the plurality of clusters that do not have the tag, extracting the at least one topic or entity from the sports articles, and generating the new tag identifying the new sports category.

Some implementations include a system (environment 100). The system includes one or more processors; memory in electronic communication with the one or more processors; and instructions stored in the memory, the instructions being executable by the one or more processors to perform any of the methods described here (e.g., A1-A11).

Some implementations include a computer-readable storage medium storing instructions executable by one or more processors to perform any of the methods described here (e.g., A1-A11).

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for identifying a new sports category, comprising:
   receiving browser data;
   identifying sports articles included in the browser data;
   classifying the sports articles into a plurality of clusters, wherein each cluster of the plurality of clusters corresponds to a sports category; identifying a cluster of the plurality of clusters that does not have a tag that identifies a corresponding sports category of the sports articles included in the cluster;
   extracting at least one topic or entity from the sports articles included in the cluster;
   generating a new tag identifying the new sports category for the cluster based on the at least one topic or entity extracted, wherein the new sports category is different from predefined sports categories;
   generating training data using at least some of the sports articles included in the cluster that is identified by the new tag; and
   providing the training data to one or more machine learning models to train the one or more machine learning models to automatically identify the new sports category.

2. The method of claim 1, wherein the new sports category is for a regional sport.

3. The method of claim 1, further comprising:
   assigning the new sports category to a region; and
   causing the new sports category to be presented with other sports categories to users determined to be in the region.

4. The method of claim 1, wherein the at least one topic or entity extracted is a dominant entity discussed in the sports articles included in the cluster.

5. The method of claim 1, further comprising:
determining whether an amount of sports data available for the new sports category exceeds a threshold level by comparing the sports data available to the threshold level.

6. The method of claim 5, wherein the sports data includes sports articles and other information for a regional sport.

7. The method of claim 5, wherein the sports data is accessed from a plurality of data providers from different regions worldwide.

8. The method of claim 5, further comprising:
sending a notification indicating that additional sports data is necessary for the new sports category in response to the sports data being below the threshold level.

9. The method of claim 5, further comprising:
integrating the new sports category with other sports categories for presentation on a browser webpage in response to the sports data exceeding the threshold level; and
creating a sports webpage dedicated to a regional sport with the sports data for presentation by a browser.

10. The method of claim 1, wherein one or more machine learning models are used for identifying the sports articles, classifying the sports articles into the plurality of clusters, identifying the cluster of the plurality of clusters that does not have the tag, extracting the at least one topic or entity from the sports articles, and generating the new tag identifying the new sports category.

11. A system, comprising:
one or more processors;
memory in electronic communication with the one or more processors; and
instructions stored in the memory, the instructions executable by the one or more processors to:
receive browser data;
identify sports articles included in the browser data;
classify the sports articles into a plurality of clusters, wherein each cluster of the plurality of clusters corresponds to a sports category;
identify a cluster of the plurality of clusters that does not have a tag that identifies a corresponding sports category of the sports articles included in the cluster;
extract at least one topic or entity from the sports articles included the in the cluster;
generate a new tag identifying a new sports category for the cluster based on the at least one topic or entity extracted, wherein the new sports category is different from predefined sports categories;
generate training data using at least some of the sports articles included in the cluster that is identified by the new tag; and
provide the training data to one or more machine learning models to train the one or more machine learning models to automatically identify the new sports category.

12. The system of claim 11, wherein the new sports category is for a regional sport and the at least one topic or entity extracted is a dominant entity discussed in the sports articles included in the cluster.

13. The system of claim 11, wherein the instructions are further executable by the one or more processors to:
assign the new sports category to a region; and
cause the new sports category to be presented with other sports categories to users determined to be in the region.

14. The system of claim 11, wherein the instructions are further executable by the one or more processors to determine whether an amount of sports data available for the new sports category exceeds a threshold level by comparing the sports data available to the threshold level.

15. The system of claim 14, wherein the sports data includes sports articles and other information for a regional sport and the sports data is accessed from a plurality of data providers from different regions worldwide.

16. The system of claim 14, wherein the instructions are further executable by the one or more processors to send a notification indicating that additional sports data is necessary for the new sports category in response to the sports data being below the threshold level.

17. The system of claim 14, wherein the instructions are further executable by the one or more processors to:
integrate the new sports category with other sports categories for presentation on a browser webpage in response to the sports data exceeding the threshold level; and
create a sports webpage dedicated to a regional sport with the sports data for presentation by a browser.

18. The system of claim 11, wherein the instructions are further executable by the one or more processors to use one or more machine learning models to identify the sports articles, classify the sports articles into the plurality of clusters, identify the cluster of the plurality of clusters that does not have the tag, extract the at least one topic or entity from the sports articles, and generate the new tag identifying the new sports category.

* * * * *